United States Patent [19]
Saarem

[11] Patent Number: 6,079,433
[45] Date of Patent: Jun. 27, 2000

[54] AUTOMATIC SOIL MOISTURE SENSING AND WATERING SYSTEM

[75] Inventor: Myrl J. Saarem, Carson City, Nev.

[73] Assignee: The Toro Company, Riverside, Calif.

[21] Appl. No.: 08/928,092

[22] Filed: Sep. 12, 1997

[51] Int. Cl.[7] .................................................. A01G 25/16
[52] U.S. Cl. ............................... 137/1; 137/78.3; 239/63; 250/573
[58] Field of Search ............................. 239/63; 137/78.2, 137/78.3, 1; 250/573

[56] References Cited

U.S. PATENT DOCUMENTS

| | | | |
|---|---|---|---|
| 2,878,671 | 3/1959 | Prosser et al. . | |
| 3,528,278 | 9/1970 | Sterling . | |
| 3,557,619 | 1/1971 | Hershler . | |
| 3,639,770 | 2/1972 | Zizelmann | 340/234 |
| 4,304,989 | 12/1981 | Vos et al. | 137/624.2 |
| 4,676,638 | 6/1987 | Yasuda | 356/237 |
| 4,737,629 | 4/1988 | Iwama et al. | 73/336.5 |
| 4,870,292 | 9/1989 | Alpert et al. | 250/577 |
| 4,880,990 | 11/1989 | Rando | 250/577 |
| 4,942,306 | 7/1990 | Colbourne | 250/577 |
| 4,979,797 | 12/1990 | Nemeth | 250/577 |
| 5,052,818 | 10/1991 | Nishizawa et al. | 73/336.5 |
| 5,088,324 | 2/1992 | Nemeth | 73/291 |
| 5,148,826 | 9/1992 | Bakhshaei | 137/78.3 |
| 5,176,320 | 1/1993 | Kraus et al. | 239/2.2 |
| 5,262,640 | 11/1993 | Purvis et al. | 318/483 |
| 5,278,425 | 1/1994 | Bendicks | 250/574 |
| 5,323,637 | 6/1994 | Bendicks et al. | 79/29.01 |
| 5,341,831 | 8/1994 | Zur | 137/78.3 |
| 5,355,122 | 10/1994 | Ercikson | 137/78.2 |
| 5,381,022 | 1/1995 | Nemeth et al. | 250/577 |
| 5,391,891 | 2/1995 | Wiegleb et al. | 250/574 |
| 5,396,325 | 3/1995 | Carome et al. | 356/128 |
| 5,621,699 | 4/1997 | Bjornsson | 239/63 |
| 5,648,724 | 7/1997 | Yankielun et al. | 340/605 |
| 5,651,500 | 7/1997 | Patterson et al. | 239/69 |

FOREIGN PATENT DOCUMENTS 0 347 095 A1  12/1989  European Pat. Off. .

OTHER PUBLICATIONS

Lyle Prunty and R. Sam Alessi, "Prospects for Fiber Optics Sensing in Soil", pp. 261–265 1996.

*Primary Examiner*—A. Michael Chambers
*Attorney, Agent, or Firm*—Harry G. Weissenberger

[57] ABSTRACT

An automatic moisture sensing and watering system detects a moisture level within the soil. The automatic moisture sensing and watering system may be implemented in combination with a conventional automatic watering system to accurately control a moisture content of a plot of soil. Since a plant draws water directly from the soil, the automatic moisture sensing and watering system is adapted for controlling the moisture content of the soil itself, by measuring the moisture content within the soil. The watering period of an automatic watering system may be changed, based upon a detected moisture content within a plot of soil. Alternatively, an amount of water to be applied at a next watering period may be changed, based upon a detected moisture content within the plot of soil.

8 Claims, 6 Drawing Sheets

AUTOMATIC SOIL MOISTURE SENSING AND WATERING SYSTEM

BACKGROUND OF THE INVENTION

1. Field of the Invention

The present invention relates generally to lawn sprinkler systems and, more particularly, to lawn sprinkler systems which can be automatically controlled to vary the amount of water applied to the lawn.

2. Description of Related Art

The growth and maintenance of many plants, trees, and crops is often dependent upon an adequate or regular supply of water. Indoor plants can be watered by hand at predetermined intervals. Similarly, many crops are automatically watered with sprinkler systems at regular intervals.

Most lawns or cultivated fields are too large to water all at once with an automatic watering system. The flow capacity and associated pressure of a typical watering system is inadequate to accomplish a single watering of the entire area. Automatic lawn sprinkler systems are thus typically divided into sections, zones, or stations, with each station being automatically watered consecutively during a given watering period. A typical watering period for a lawn, for example, might range between several times a day to once in several weeks.

In addition to the low-pressure problems associated with many municipal watering distribution systems, water shortages are often encountered, as well. Many municipalities have imposed watering restrictions, based upon either the municipal water distribution system's inadequate ability to keep up with demand, water shortages, or a combination of both. A typical watering restriction imposes a maximum number of permissible waterings per week, for example. Although watering can be scheduled at any time during a given day, it is generally desirably to water in the early morning hours when there is less wind and consequently less evaporation.

A typical automatic lawn sprinkler system can be programmed to deliver a predetermined amount of water at each pre-set watering period, per watering zone. Many lawn sprinkler system controllers can be easily adjusted by manual programming in order to change the watering time by a desired percentage. Even with this manual adjustment capability, optimal watering of lawns, for example, can be difficult to achieve. During periods of significant rainfall, a lawn sprinkler system can over-water a lawn, potentially damaging the lawn and wasting water which could otherwise be conserved. Even if a user attempts to manually adjust for the rainfall, an inconsistent manual control of the lawn sprinkler system can damage a lawn by applying too much or too little water. An inexpensive, reliable, and accurate device which could automatically detect a moisture level of soil, and apply water accordingly, would be advantageous.

Various devices have been implemented in the past for sensing moisture. U.S. Pat. No. 4,737,629 to Iwama et al. discloses an example of a control system, which incorporates a light emitter and a light receiver in order to detect the deposition of water drops on a wind screen. The control system detects the deposition of water drops on the wind screen by measuring a degree of optical scattering, which is a function of the amount of water drops on the wind screen. A control system automatically activates a defogging apparatus when a specified amount of water is detected on the wind screen.

Although the prior devices have incorporated moisture detecting systems to achieve various ends, such as defogging a wind screen, these devices have not optimally incorporated an economical, accurate, and efficient moisture sensor for the purpose of automatically watering a lawn, based upon an amount of moisture detected in the soil. Soil moisture sensors have existed in the prior art, but these devices have been prohibitively expensive, complex, inaccurate, unreliable, and/or susceptible to changes in soil salinity. Examples of existing soil moisture sensors (not necessarily prior art) include tensiometer, gypsum block, fiberglass block, conducting electrodes, dielectric constant of a capacitor, materials that change size in moisture, lysimeter, hygrometers, psychrometer, time domain reflectometer, neutron absorption, X-ray computed tomography, nuclear magnetic resonance, and microwave attenuation. U.S. Pat. No. 5,355,122 to Erickson discloses an apparatus, which can disable a sprinkler system upon the detected occurrence of a rain shower, but soil moisture is not sensed. The device utilizes a receptacle for accumulating rainfall, and disables the sprinkler system when a predetermined amount of rainfall accumulation is obtained within the receptacle. Thus, the watering system follows a predetermined watering schedule, unless a significant rain shower is detected. This prior art apparatus is not effective for controlling a moisture content of soil within a potted plant, for example, which is not watered by sprinklers or rainfall. Additionally, since this prior art device does not measure soil moisture, for example, the device does not account for differences in humidity and light exposure, both of which may contribute to different soil-moisture change rates. Additionally, the open receptacle of the device may become covered with debris, such as insects, leaves, or earth born contaminants. The prior art apparatus, additionally, is not very accurate, since the apparatus basically performs a binary determination of whether or not a next scheduled sprinkler watering should be executed.

SUMMARY OF THE INVENTION

The automatic moisture sensing and watering system of the present invention detects a moisture level within the soil. The automatic moisture sensing and watering system is relatively unaffected by soil salinity, and the materials of the automatic moisture sensing and watering system do not deteriorate in soil. The automatic moisture sensing and watering system of the present invention may be implemented in combination with a conventional automatic watering system to accurately control a moisture content of a plot of soil. Since a plant draws water directly from the soil, the automatic moisture sensing and watering system is adapted for controlling the moisture content of the soil itself, by measuring the moisture content within the soil. The watering period of an automatic watering system may be changed, based upon a detected moisture content within a plot of soil. Alternatively, an amount of water to be applied at a next watering period may be changed, based upon a detected moisture content within the plot of soil.

According to one aspect of the present invention, an apparatus for controlling the level of moisture in a plot of soil includes a radiation path adapted for receiving radiation and transmitting radiation therethrough, a radiation source adapted for emitting radiation into the radiation path, and a radiation receiver adapted for receiving radiation from the radiation path. The apparatus further includes a determiner adapted for determining a treatment of water to be applied to the plot of soil, based upon an amount of radiation received by the radiation receiver.

A porous membrane may be disposed around the radiation path. The porous membrane is adapted for preventing the radiation path from directly contacting the plot of soil. The porous membrane is thus configured to allow the passage of moisture therethrough, while preventing the passage of soil through the porous membrane. A number of particles may be disposed between the radiation path and the porous membrane, with each of the particles having a diameter that is larger than a diameter of a pore in the porous membrane. Each particle between the porous membrane and the radiation path may comprise a glass micro-bead, for example.

The radiation path includes a soil contacting surface, which is adapted for contacting a portion of the plot of soil unless the porous membrane and particles are used. The radiation path is adapted for transmitting a first percentage of incident radiation therethrough when the plot of soil is relatively moist, and for transmitting a second percentage of incident radiation therethrough when the plot of soil is relatively dry. The radiation path may comprise either a U-shaped cylinder or at least one planar reflective surface. The U-shaped cylinder includes an input end adapted for receiving the radiation from the radiation source and further includes an output end adapted for feeding radiation into the radiation receiver. The reflective surface is adapted for receiving the radiation from the radiation source and for reflecting a portion of the received radiation toward the radiation receiver. Regardless of the configuration of the radiation path, the first percentage will be greater than the second percentage.

According to another feature of the present invention, an apparatus for measuring a moisture content of a plot of soil includes a radiation source adapted for emitting radiation, a radiation path adapted for transmitting radiation emitted from the radiation source, and a radiation receiver adapted for receiving radiation from the radiation path. The apparatus further includes an output circuit adapted for generating at least three different output levels, corresponding to a soil-wet condition, a soil-dry condition, and an intermediate condition. The output circuit is adapted for generating the three different output values, based upon an amount of radiation received by the radiation receiver. The output circuit can be adapted for generating an analog output having a continuous range of output values corresponding to a range of conditions from the soil-wet condition to the soil-dry condition. Alternatively, the output circuit can be adapted for generating a digital output having a plurality of discrete output values corresponding to a range of conditions from the soil-wet condition to the soil-dry condition. The apparatus may further include a determiner adapted for receiving the output value from the output circuit, and for determining a treatment of water to be applied to the plot of soil based upon the output value received from the output circuit. The determiner may be adapted for determining a time when the plot of soil should next be watered or, alternatively, may be adapted for determining a quantity of water that should be applied at a next predetermined watering time.

The apparatus may include a radiation detector adapted for detecting an amount of radiation received by the radiation receiver, and a comparator adapted for comparing the detected amount of radiation with a stored value. The radiation path can include at least one reflective surface adapted for receiving radiation from the radiation source and for reflecting the radiation in a general direction toward the radiation receiver. The reflective surface is adapted for reflecting a relatively large amount of radiation, in a general direction toward the radiation receiver, when the reflective surface is in contact with relatively dry soil. The reflective surface may include a planar surface, with a side of the planar surface adapted for being placed into contact with soil.

A method of the present invention includes a first step of emitting radiation from a radiation source and a second step of receiving radiation by a radiation detector. The receiving step is followed by a step of measuring an amount of radiation received by the radiation detector, and a subsequent step of comparing the measured amount of radiation with a stored value. A treatment of water that is to be applied to the plot of soil is then determined, based upon an amount of radiation received by the radiation detector.

According to another aspect of the present invention, a method of automatically determining a quantity of water to be applied at a next predetermined watering period includes a step of generating a first moisture measurement. The first moisture measurement, which reflects a content of moisture in a plot of soil, is then stored in a memory. A second moisture measurement is then generated. The second moisture measurement reflects a content of moisture in the plot of soil at a time subsequent to a time of the first moisture measurement. The first moisture measurement is then compared with the second moisture measurement, and a quantity of water to be applied at the next predetermined watering period is then automatically determined, based upon a result of the comparing step. The comparing step can be followed by a step of determining a rate of change of a content of moisture of the plot of soil. The step of automatically determining a quantity of water can comprise a step of automatically determining a relatively large quantity of water to be applied to the plot of soil, upon a determined rate of change indicating that the soil is losing moisture at a relatively high rate. Similarly, the step of automatically determining a quantity of water can comprise a step of automatically determining a relatively small quantity of water to be applied to the plot of soil, upon a determined rate of change indicating that the soil is losing moisture at a relatively low rate.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figure 1A:
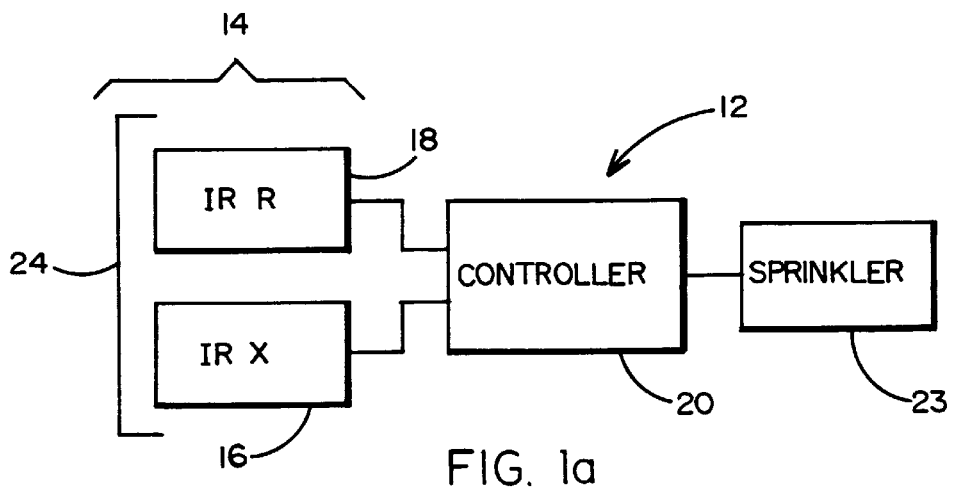
FIG. 1a illustrates a schematic block diagram of the automatic moisture sensing and watering system of the present invention.

Referring now more particularly to the drawings, FIG. 1a illustrates a schematic block diagram of the automatic moisture sensing and watering system 12 of the present invention. The automatic moisture sensing and watering system 12 includes a moisture sensor 14, which generally includes an infrared transmitter 16 and an infrared receiver 18. A controller 20 controls the infrared transmitter 16, the infrared receiver 18, and a sprinkler valve 23. A porous membrane 24 may be disposed around the moisture sensor 14. The porous membrane 24 is adapted for preventing the moisture sensor 14 from directly contacting the plot of soil.

Figure 1B:
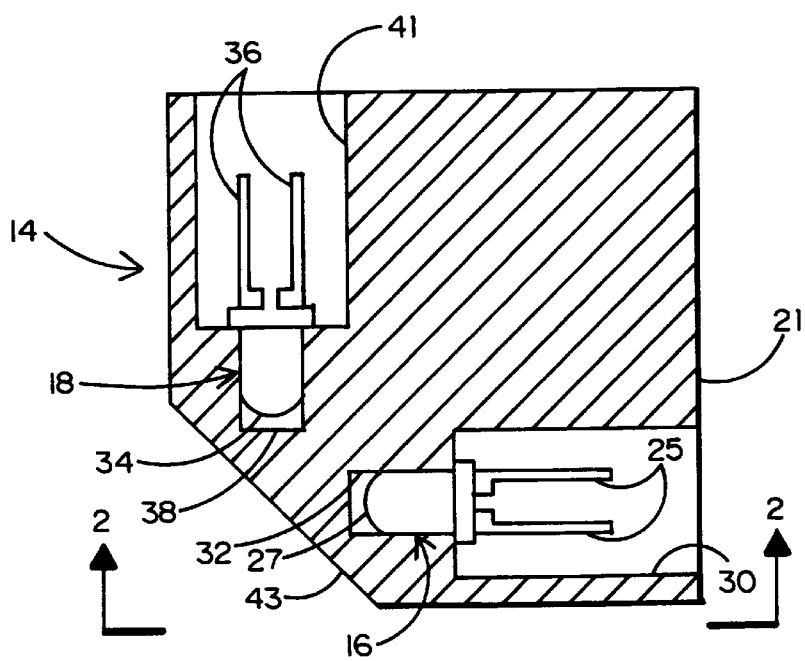
FIG. 1b illustrates a cross-sectional view of a single-face moisture sensor, according to a first embodiment of the present invention.
Figure 2:
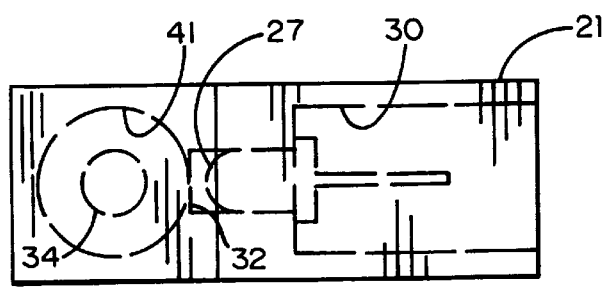
FIG. 2 illustrates an end view of the single-face moisture sensor, taken along line 2—2 of FIG. 1b.

A first embodiment of the moisture sensor 14 is illustrated in FIG. 1b, comprising an infrared transmitter 16, an infrared receiver 18, and a housing 21. The infrared transmitter 16 comprises transmitter connector elements 25 and a transmitter element 27. As presently embodied, the transmitter element 27 comprises an infrared light source, such as a light emitting diode (LED). The housing 21 may comprise any of a variety of materials, and is preferably configured to comprise an acrylic polymer. The housing is preferably configured to be transparent to the radiation, and to have an index of refraction that is greater than the index of refraction of air. The index of refraction is preferably chosen to be near the index of refraction of water. The housing 21 includes a transmitter connector cavity 30 and a transmitter optical cavity 32. The transmitter optical cavity 32 preferably comprises an optically polished surface, which is located opposite the transmitter connector elements 25.

The infrared receiver 18 comprises a receiver element 34 and receiver connector elements 36. The receiver element 34 preferably comprises an infrared photo transistor. The receiver element 34 preferably comprises an infrared photo transistor. The receiver element 34 is disposed within a receiver optical cavity 38 of the housing 21, and the receiver connector elements 36 are disposed within a receiver connector cavity 41 of the housing 21. Similarly to the optically polished surface of the transmitter optical cavity 32, an optically polished surface is formed on an end of the receiver optical cavity 38 that is opposite the receiver connector elements 36. Within the optical cavities 32 and 38, the surfaces facing the receiver 18 and transmitter 16 respectively, will typically be polished.

An optically polished surface 43 is disposed on the housing 21 adjacent to the infrared transmitter 16 and the infrared receiver 18. The optically polished surface 43 is adapted for reflecting light emitted from the infrared transmitter 16 in a direction toward the infrared receiver 18. The optically polished surface 43 is adapted for being placed directly into contact with soil. When a moisture level of the soil is relatively high, a percentage of light from the infrared transmitter 16 is transmitted through the optically polished surface 43. The amount of light received by the infrared receiver 18 is determined by the amount of light that is reflected by the optically polished surface 43. Accordingly, the amount of light received by the infrared receiver 18 is a function of an amount of moisture on the optically polished surface 43. When the sensor 14 is buried in soil, the soil is in intimate contact with the optically polished surface 43. If the soil is moist, a relatively large percentage of the light from the infrared transmitter 16 is transmitted through the optically polished surface 43.

Figure 3:
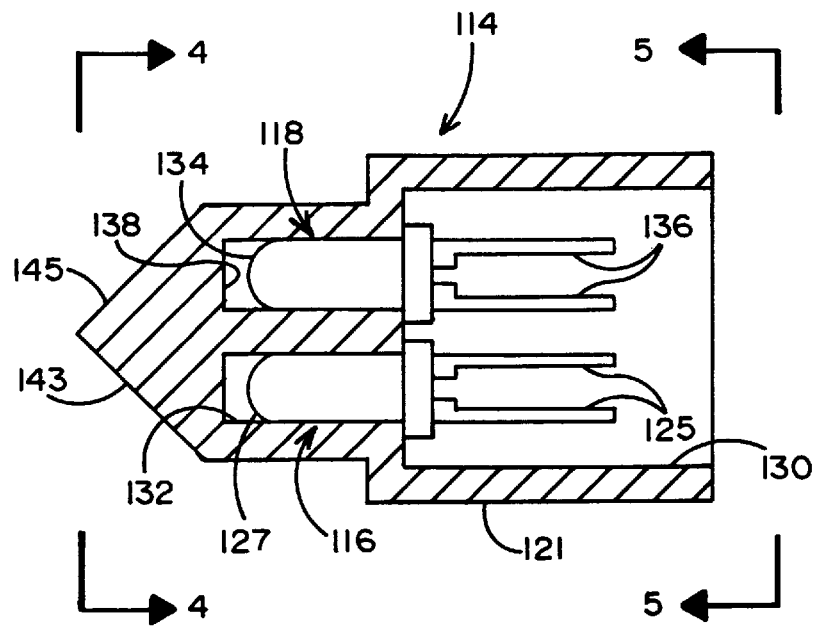
FIG. 3 illustrates a cross-sectional view of a prism moisture sensor, according to a presently preferred embodiment.

FIG. 3 illustrates a prism moisture sensor 114, according to the presently preferred embodiment. This prism moisture sensor 114 comprises a number of components which are similar to the components of the single-faced moisture sensor 14 of FIG. 16. In the discussion of the prism moisture sensor 114, elements similar to those previously discussed are designated by the same reference numeral preceded with a "1." An infrared transmitter 116 and an infrared receiver 118 are disposed in a housing 121. The infrared transmitter 116 comprises transmitter connector elements 125 and a transmitter element 127. The transmitter connector elements 125 are disposed within a transmitter connector cavity 130 of the housing 121, and the transmitter element 127 is disposed within a transmitter optical cavity 132 of the housing 121. Similarly, the infrared receiver 118 comprises a receiver element 134 and receiver connector elements 136, which are disposed within a receiver optical cavity 138 and the receiver connector cavity 141, respectively. Within the optical cavities 132 and 138, the surfaces facing the ends of the transmitter 116 and receiver 118 will typically be polished.

A porous membrane 24 (FIG. 1a) can be disposed around the housing 121, to thereby prevent the housing 121 from directly contacting the soil. The amount of water that adheres to the first and second optically polished surfaces 143, 145 depends upon a number of properties of the soil next to these two surfaces 143, 145. These properties include particle size, composition, adhesion surface tension, and vapor pressure. The porous membrane 24 can reduce the individual effects caused by the soil upon the two surfaces 143, 145, since the porous membrane 24 attenuates or eliminates direct contact of the two surfaces 143, 145 with the soil. Additionally, glass beads or other particles having predetermined properties may be placed between the porous membrane and the two surfaces 143, 145 for further separating the two surfaces 143, 145 from the soil.

Figure 4:
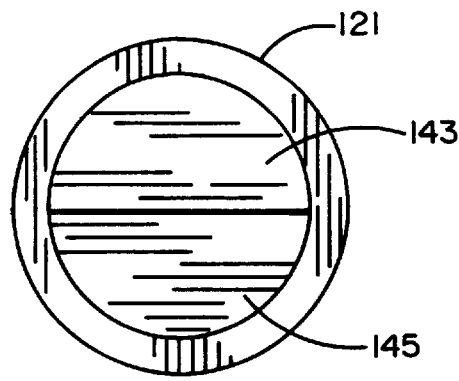
FIG. 4 illustrates an end view of the prism moisture sensor, taken along line 4—4 of FIG. 3.
Figure 5:
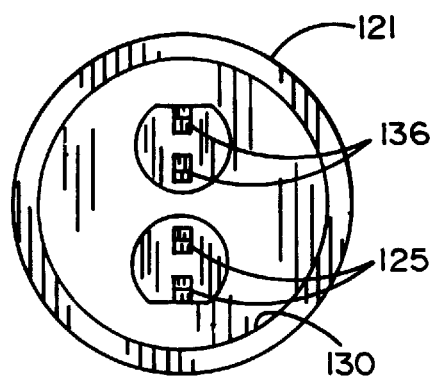
FIG. 5 illustrates an end view of the prism moisture sensor, taken along line 5—5 of FIG. 3.

The prism moisture sensor 114 comprises a first optically polished surface 143 and a second optically polished surface 145. FIG. 4 illustrates an end view of the prism moisture sensor 114, taken from the line 4—4 of FIG. 3. Light from the infrared transmitter 116 first contacts the first optically polished surface 143. A percentage of light is transmitted through the first optically polished surface 143, depending upon an amount of moisture on the first optically polished surface 143. Another percentage of the light from the infrared transmitter 116 is reflected by the first optically polished surface 143 onto the second optically polished surface 145. An amount of this light is transmitted through the second optically polished surface 145, depending upon an amount of moisture on the second optically polished surface 145. An amount of light that is not transmitted through the second optically polished surface 145 is reflected to the infrared receiver 118. FIG. 5 illustrates an end view of the prism moisture sensor 114, taken along line 5—5 of FIG. 3.

Figure 6:
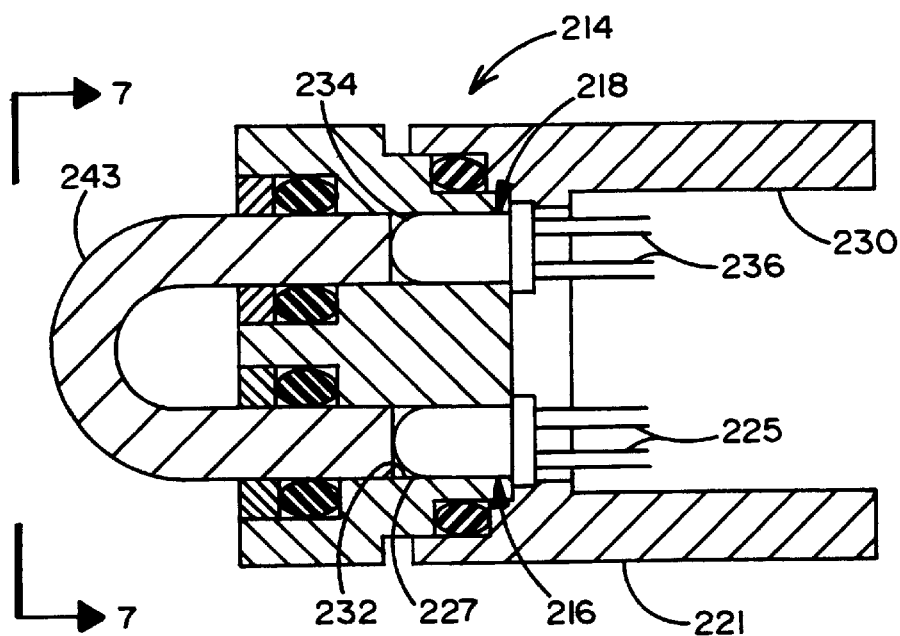
FIG. 6 illustrates a cross-sectional view of a U-shaped moisture sensor, according to an alternative embodiment of the present invention.
Figure 7:
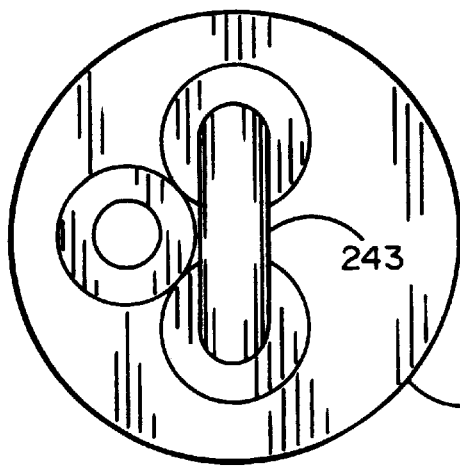
FIG. 7 illustrates an end view of the U-shaped moisture sensor, taken along line 7—7 of FIG. 6.

A further embodiment of the invention is illustrated in FIG. 6 where elements similar to those previously discussed are designated by the same reference numeral preceded by the number "2." Thus, FIG. 6 illustrates a bent-tube moisture sensor 214 including an infrared transmitter 216 and an infrared receiver 218. The infrared transmitter 216 comprises a transmitter element 227 and transmitter connector elements 225, which are disposed within a transmitter optical cavity 232 and a transmitter connector cavity 230, respectively. Similarly, the infrared receiver 218 comprises a receiver element 234 and receiver connector elements 236, which are disposed within a receiver optical cavity 238 and a receiver connector cavity 241, respectively. A bent tube 243 optically couples the infrared transmitter 216 to the infrared receiver 218. The bent portion of the bent tube 243 is adapted for contacting soil. A percentage of light from the infrared transmitter 216 that is received by the infrared receiver 218 decreases as an amount of moisture on the bent tube 243 increases. FIG. 7 illustrates an end view of the bent-tube moisture sensor 214, taken along line 7—7 of FIG. 6.

The prism moisture sensor 114 of FIG. 3 currently comprises the presently preferred embodiment, based in part upon tests which were performed on the three sensors 14, 114 and 214. A sandy loam soil was obtained for these tests. The soil was baked at approximately 250 degrees Fahrenheit for a period of six hours in order to thoroughly dry the soil. Containers having diameters of 6.5 inches and heights of 7 inches were used as soil containers. The sensors and containers were accurately weighed, and paper coffee filters were place in the bottom portions of each of the pots. The paper coffee filters acted to block loss of soil from drainage holes disposed in the bottoms of the containers. Approximately five pounds of dry soil was placed in each of the containers, and each of the three sensors 14, 114 and 214 were buried in the dry soil at a depth of approximately 2.5 inches from a top surface of the soil.

Each of the pots, having a respective filter, sensor and soil, was accurately weighed. Output voltages were measured for each sensor. Subsequently, water was added to each pot incrementally until the soil could hold no more water. More particularly, water was added to each pot until steady drainage was observed from the pot drainage holes, but standing water did not exist at the surface of the soil. This condition was assumed to represent field moisture saturation, and was considered to be approximately 100% saturation by weight. Output voltage readings were then measured. The pots were allowed to dry. Weight and voltage output readings were taken at arbitrary times. When the moisture content reached approximately 5%, the first cycle was considered complete and water was again added to the pots, and the data process was again repeated. This testing procedure was continued until four drying cycles were completed.

Figure 8:
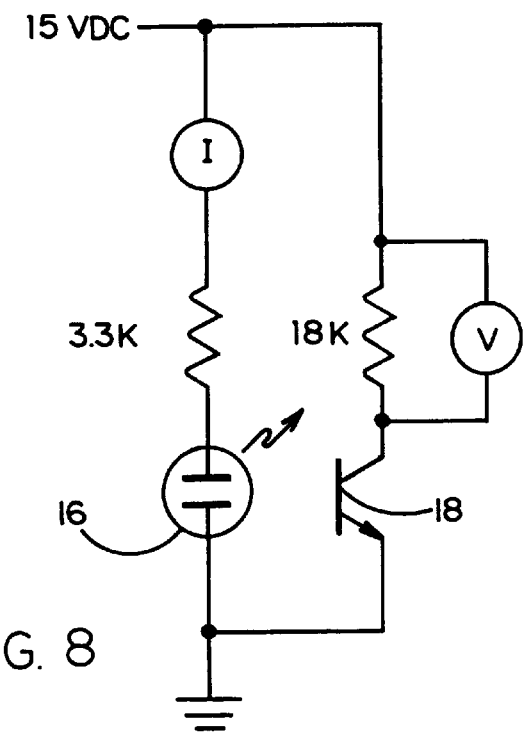
FIG. 8 illustrates a general circuit diagram of the moisture sensor of the present invention.
Figure 9:
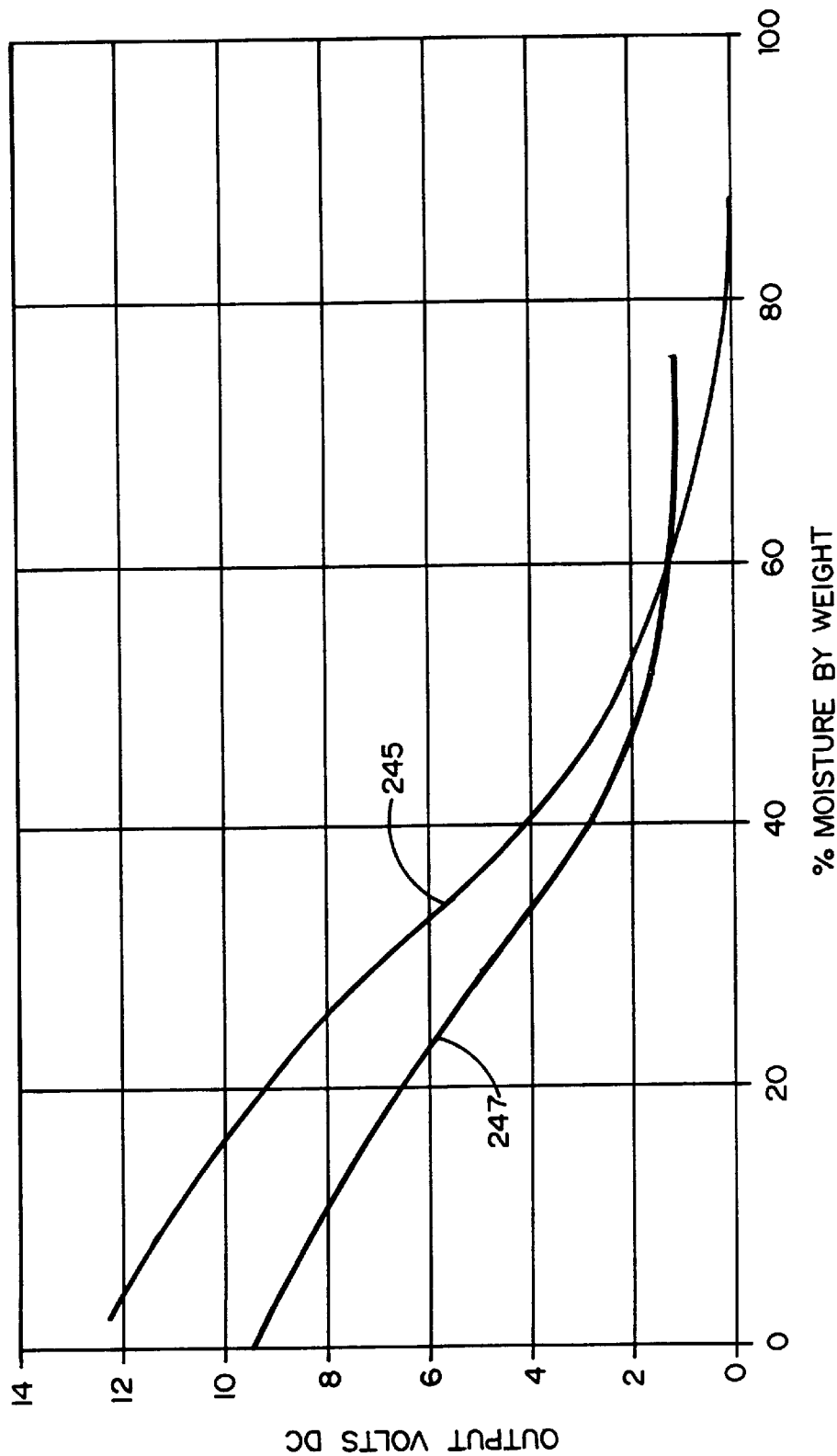
FIG. 9 illustrates a plot of output voltage from a prism moisture sensor versus moisture, according to the present invention.
Figure 10:
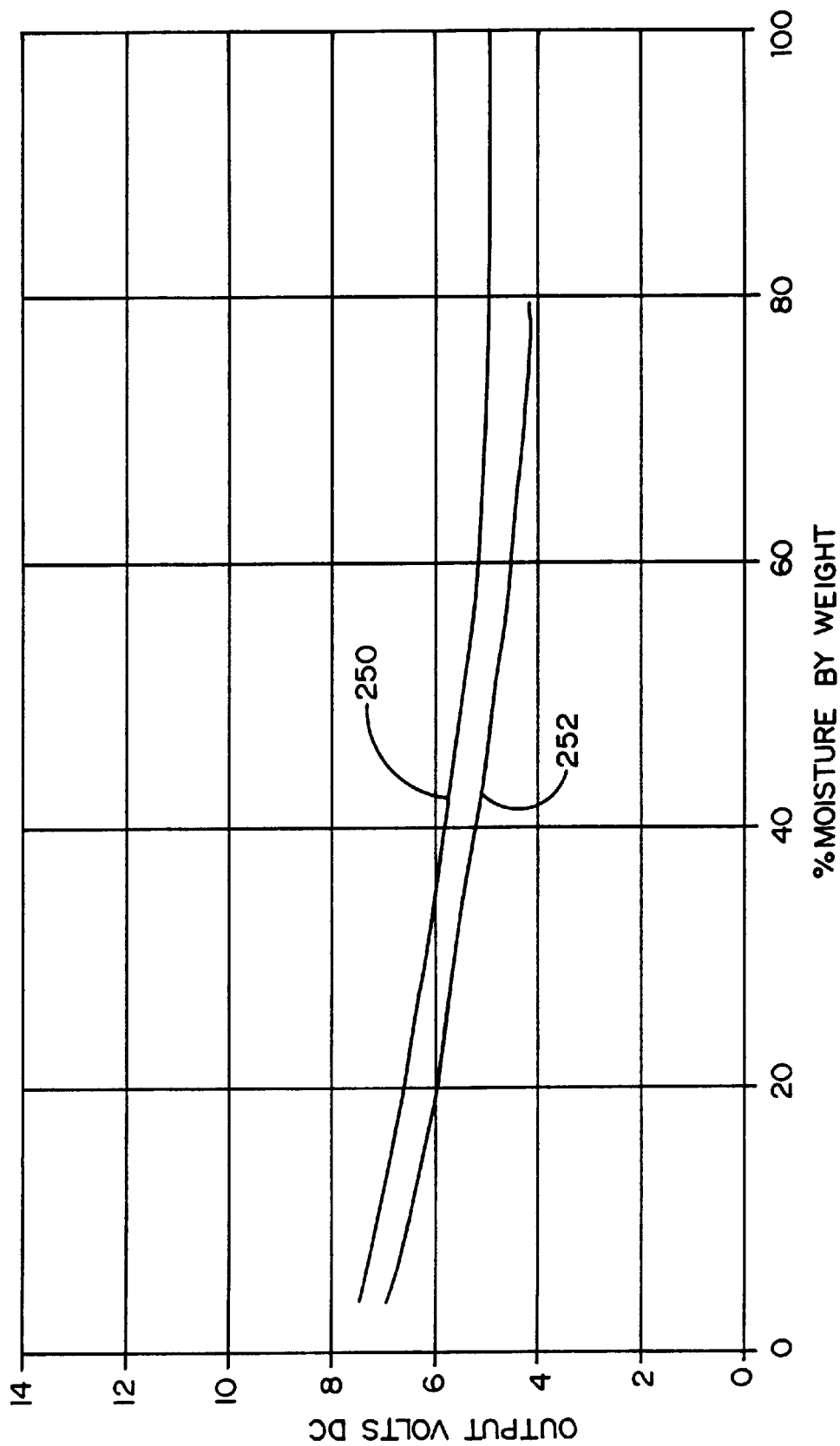
FIG. 10 illustrates another plot of output voltage from a U-shaped moisture sensor versus moisture, according to the present invention.

FIG. 8 generally illustrates a schematic of the circuit, which was used to obtain the voltage output from each of the sensors 14, 114, and 214. FIG. 9 illustrates the plotted data for the prism moisture sensor 114, and FIG. 10 illustrates the plotted data for the bent-tube moisture sensor 214. Data from the first of the four cycles is plotted on line 245 of FIG. 9, and data from the second, third, and fourth cycles is plotted generally on line 247 of FIG. 9. Similarly, data from the first cycle is plotted on line 250 of FIG. 10, and data from the second, third, and fourth cycles is plotted on the line 252 of FIG. 10. From the plotted date of FIGS. 9 and 10, the prism moisture sensor 114 was determined to have a greater sensitivity to soil moisture than the bent-tube sensor 214, since the output voltage swing is significantly greater for the prism moisture sensor 114.

Referring back to the single-faced moisture sensor 14 of FIG. 1b, it is noted that the process for mounting and potting the lead wire of this particular embodiment was somewhat difficult, relative to the construction of the FIG. 3 and FIG. 6 embodiments. The lead wire mounting and potting of the single-faced moisture sensor 14 may require a four-wire egress and separate cure times for potting each section. The prism moisture sensor 114 of the presently preferred embodiment, however, can utilize a single egress for all of the wires from the connectors 125 and 136. Additionally, the prism moisture sensor 114 can be potted in a single operation. According to one alternative embodiment, a two wire unit may be configured by placing a small amount of circuitry into the sensor 114, as opposed to the controller 20. In this alternative embodiment, a single input wire and a single return ground wire can be used to conduct both the infrared transmitter 16 current and the infrared receiver 18 current.

The prism moisture sensor 114 data of FIG. 9 and the bent-tube moisture sensor 214 data of FIG. 10 both illustrate a shift in output between the first and subsequent cycles of watering. This phenomena can likely be attributed to a thin film of clay soil (extremely small particles) adhering to the reflective surfaces of the respective sensors 114, 214, after the first watering. Since the shift attenuated with each subsequent watering cycle, the moisture sensors can be pre-cycled a number of times before actual implementation, for added accuracy. The above-described tests were performed on one sample of each type sensor and, therefore, may not have conclusive statistical significance. The tests tended to show various behavioral parameters which have been addressed by the present invention, and which are intended to be encompassed within the scope of the present invention.

An important feature of the present invention comprises the utilization of a moisture sensor for monitoring a moisture content of soil. Various configurations and treatments may be applied to such moisture sensors for optimization. For example, a hydrophilic or a hydrophobic coating may be applied on the surface of any of the disclosed sensors. The hydrophilic coating attracts water and tends to coat the entire sensing surface with a thin film of water. The hydrophobic coating resists water, and water that does attach to the sensing surface will be in a form of beads of water. Each of these embodiments will provide different relative readings of moisture.

The controller 20 (FIG. 1a) of the present invention is preferably adapted for delivering a programmed amount of water to each specified watering zone, at predetermined watering intervals. By using a prism moisture sensor 114, which provides information on the soil moisture content level, the controller 20 is able to perform additional tasks. The controller 20 can be configured to take periodic measurements from the prism moisture sensor 114 in order to monitor a moisture content of the soil. Periodic measurements may also be used to generate a rate of change of the moisture content within the soil. A great rate of change may indicate, for example, that the soil is losing moisture at an abnormally high rate, in which case a period for a next watering of the soil may be required to be accelerated. Additionally, the controller 20 can determine a quantity of water which should be supplied to a watering zone at a next watering period. In one embodiment, a watering start time is fixed and the length of the watering period is varied according to an amount of moisture needed. A variety of algorithms can be adapted to establish optimum cyclical watering conditions, depending upon particular plant information for crops, grasses, or other varieties under different conditions, including controlled nursery conditions. For example, the amount of moisture needed may be greater for a fern than for a cactus.

Figure 11:
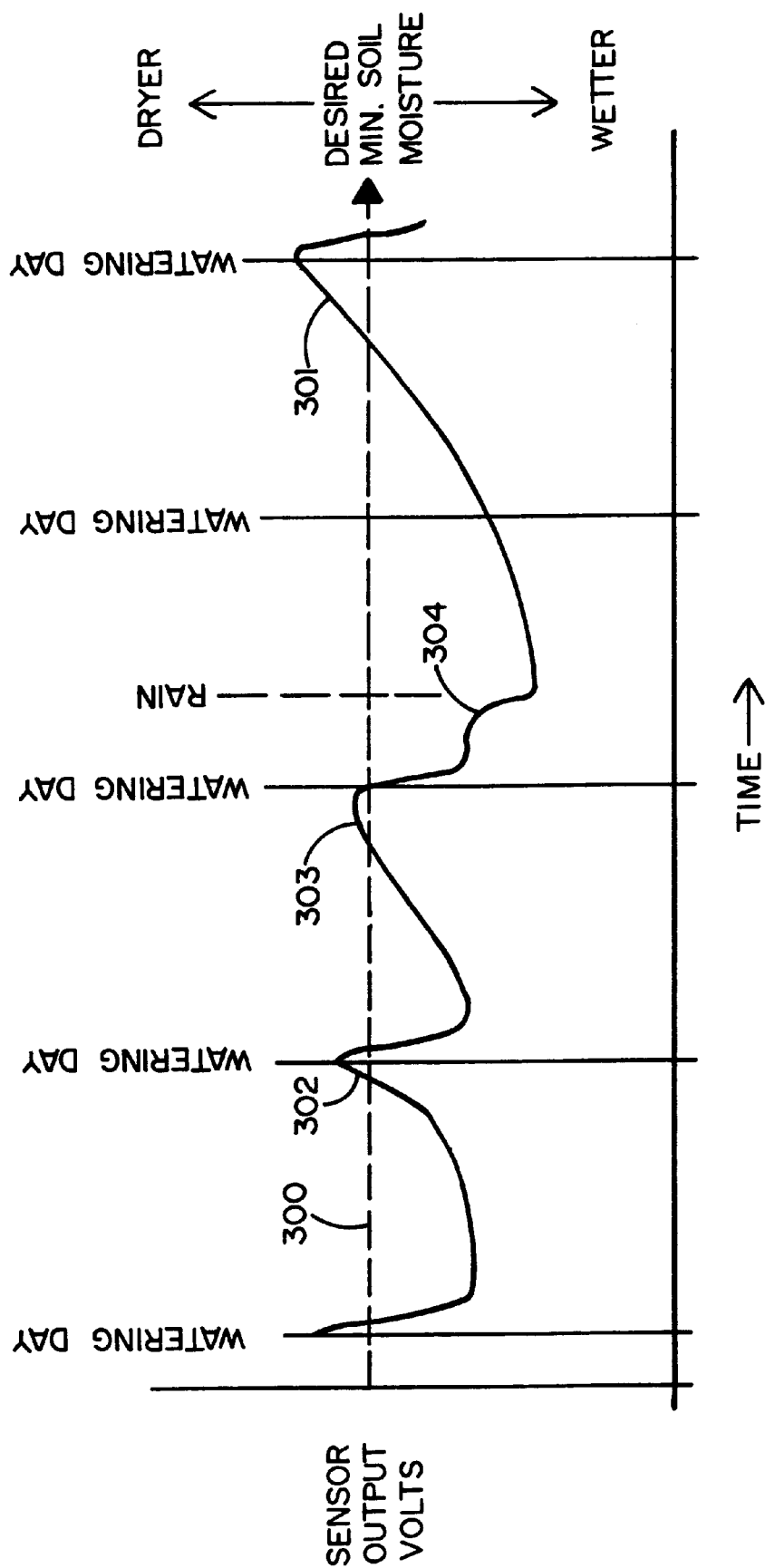
FIG. 11 illustrates a plot of output voltage from a moisture sensor versus time, according to the present invention.

The plot of sensor voltage output versus time, shown in FIG. 11, illustrates five watering days along the time axis. These watering days may correspond to pre-programmed early-morning watering periods instructed by the controller 20 during the early morning of every other day.

A dotted line 300, which is parallel to the time axis, shows the sensor output level which corresponds to the dryness bench mark at which water should be added. The controller 100 functions according to the position of the curve shown in FIG. 11. Each point on the curve corresponds to an absolute value of moisture and a slope, which corresponds to a change in the value of moisture. A large positive slope, for example, indicates that the soil is drying quickly. Area 301 illustrates a curved slope that is considered normal. Upon the occurrence of the next prescribed watering time during this normal slope, a regular watering of the soil occurs. Area 302 illustrates an increased slope, indicating conditions which cause greater than normal drying of the soil. The controller 20 determines a greater than normal water application, which is to be applied to the plot of soil, when the increased slope area 302 is encountered. Area 303 illustrates a lesser slope than normal, indicating that the soil is losing moisture at a less than normal rate. The controller 20 determines a lesser amount of water to be applied, upon encountering the lesser-sloped area 303. FIG. 11 also illustrates a period 304 where rain has occurred, in which case watering does not occur at the next predetermined watering time.

Although exemplary embodiments of the invention have been shown and described, many other changes, modifications and substitutions, in addition to those set forth in the above paragraphs, may be made by one having ordinary skill in the art without necessarily departing from the spirit and scope of this invention. For example, sensors may be incorporated for continuously monitoring a plot of soil. If the plot of soil begins to receive an excessive amount of water during a cycle, the sensor can communicate this fact to reduce the amount of watering. Additionally, a plurality of sensors can be disposed over a plot of soil, and the values of the sensors averaged or optimized for defining the next watering cycle. As another alternative, the length of the cycle can be determined, based upon sensed moisture levels in the soil.

What is claimed is:

1. A method of automatically determining a quantity of water to be applied at a next predetermined watering start time, the method comprising the following steps:

generating a first moisture measurement, the first moisture measurement reflecting a content of moisture in a plot of soil;

storing the first moisture measurement in a memory;

generating a second moisture measurement, the second moisture measurement reflecting a content of moisture in the plot of soil at a time subsequent to the first moisture measurement;

comparing the second moisture measurement to the first moisture measurement; and automatically determining a quantity of water to be applied at the next predetermined watering time, based upon a result of the comparing step.

2. The method according to claim 1, the comparing step being followed by a step of determining a rate of change of a content of moisture of the plot of soil.

3. The method according to claim 2, the step of automatically determining a quantity of water comprising a step of automatically determining a relatively large quantity of water to be applied to the plot of soil, upon a determined rate of change indicating that the soil is losing moisture at a relatively fast rate.

4. The method according to claim 3, the step of automatically determining a quantity of water comprising a step of automatically determining a relatively small quantity of water to be applied to the plot of soil, upon a determined rate of change indicating that the soil is losing moisture at a relatively slow rate.

5. A method of inexpensively maintaining a plot of soil at a predetermined moisture level, comprising the steps of:

a) embedding in said soil a corrosion-resistant sensor having a surface exposed to moisture in said soil and having a radiation source and a radiation receiver, said surface being arranged to reflect to said receiver a time-varying quantity of radiation substantially proportional to the moisture content of said soil;

b) producing a signal indicative of the moisture content sensed by said sensor;

c) computing, from said signal, the amount of irrigation needed to maintain the moisture content of said soil at a predetermined level; and d) causing said plot of soil to be irrigated with said needed amount of irrigation.

6. A sensor adapted to be embedded in a plot of soil to track the moisture content of said soil, comprising:

a) a radiation source;

b) a radiation receiver; and c) a transparent body forming a radiation path from said source to said receiver;

d) said body including at least one surface disposed in said path and arranged to reflect toward said receiver a quantity of radiation which varies over time substantially proportionally to the moisture contact of said soil when said sensor is embedded therein.

7. Apparatus for maintaining a plot of soil at a predetermined moisture level, comprising:

a) a corrosion-resistant sensor adapted to be embedded in said soil, said sensor including:

i) a radiation source;

ii) a radiation receiver;

iii) a transparent body forming a radiation path from said source to said receiver;

iv) said body including at least one surface disposed in said path and arranged to reflect toward said receiver a quantity of radiation which varies over time substantially proportionally to the moisture contact of said soil when said sensor is embedded therein; and b) an irrigation controller connected to said sensor and arranged to irrigate said plot of soil at a rate commensurate with said quantity of radiation received by said receiver so as to maintain said moisture content of said soil substantially constant.

8. The apparatus of claim 7, in which said controller is responsive to the time rate of change of said quantity of received radiation to predictively determine the irrigation level necessary to maintain said moisture content of said soil.

* * * * *